V. F. BOWERS.
CONVEYER BELT.
APPLICATION FILED JULY 6, 1915.
1,194,704.                          Patented Aug. 15, 1916.
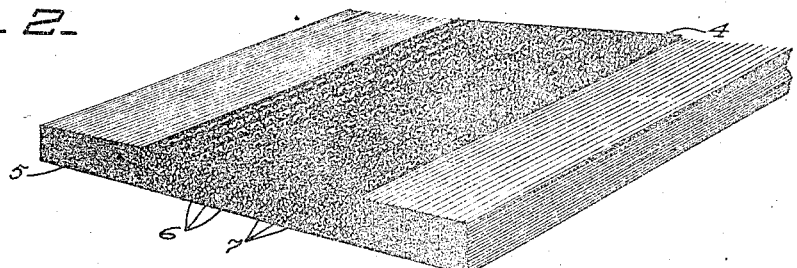
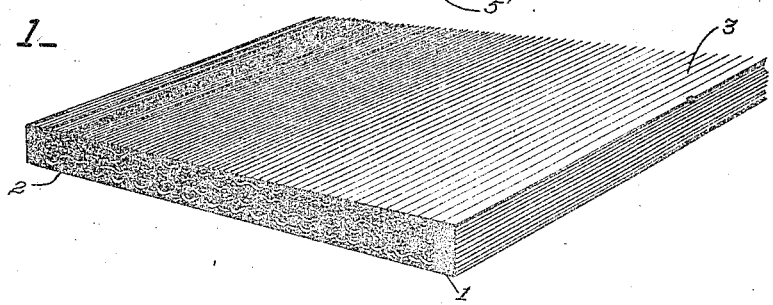
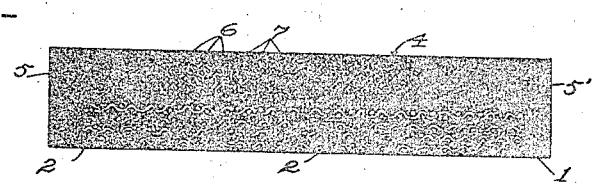
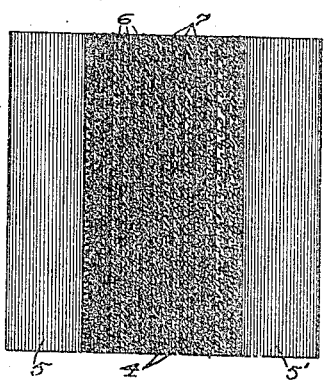
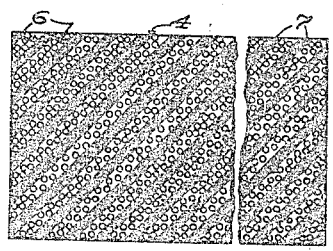
WITNESS
INVENTOR
William F. Bowers
BY
Acker & Jordan
ATTORNEYS.

UNITED STATES PATENT OFFICE.

WILLIAM F. BOWERS, OF SAN FRANCISCO, CALIFORNIA.

CONVEYER-BELT.

1,194,704.

Specification of Letters Patent.

Patented Aug. 15, 1916.

Application filed July 6, 1915. Serial No. 38,292.

*To all whom it may concern:*

Be it known that I, WILLIAM F. BOWERS, a citizen of the United States, residing in the city and county of San Francisco and State of California, have invented certain new and useful Improvements in Conveyer-Belts, of which the following is a specification.

The hereinafter described invention while applicable for work generally in transporting and conveying of material for given distances, is more particularly designed for use in connection with removing the tailings from gold dredgers to a suitable place of deposit.

In the work of gold dredging the tailings are delivered onto the surface of the upper run of an endless traveling conveyer belt, and where the conveyer belt is composed of composite material, such as rubber and textile fabric, the fall or deposit of the waste material or tailings onto the surface of the conveyer belt, together with the frictional wear thereon caused by the slippage of the material being conveyed to a point of discharge, (usually at an elevation) quickly wears the upper face of the belt to such an extent as to destroy the usefulness of the same for effective work as a conveyer. Various means have been employed to overcome this defect incident to composite conveyer belts for the purpose of prolonging the life and usefulness thereof for effective working purposes, one of the means thus employed being disclosed by United States Letters Patent No. 814,416, granted J. J. Voorhees under date of March 6, 1906. Under the invention of said Letters Patent there is provided a composite conveyer belt composed of rubber having embedded therein horizontal layers of textile fabric which serve to give longitudinal strength to the belt and reinforcement for the under surface or pulley surface of the belt. The upper face or wearing surface of the belt has embedded in the rubber thereof a series of longitudinally disposed layers of fabric set edgewise or in a plane perpendicular to the horizontal layers of fabric, each of the said perpendicular layers being separated by the rubber or cementing material of the belt or conveyer. While under such a constructed conveyer the perpendicular layers of fabric materially prolongs the life of the conveyer by offering a greater resistance against wear, due to the fact that the wear and tear takes place upon the ends only of said textile or fabric layers. However, practice has disclosed that in the use of such a constructed belt the lateral contraction and expansion which takes place during the troughing periods of the conveyer as carried over the supporting pulleys tends to and does cause a separation or tearing apart of the vertically or perpendicularly disposed longitudinal layers to such an extent as to cause the material on the surface of the belt to gradually work and settle between the separated faces of said layers, which results in a comparative quick wearing of the upper surface of the conveyer belt. It is this defect in the recognized composite conveyer belt provided with an upper wear surface which the present invention successfully overcomes, and by so doing materially prolonging the life thereof and necessarily its working efficiency, and materially reducing the expense as to the upkeep of the composite conveyer belts.

To comprehend the invention, reference should be had to the accompanying drawings, wherein—

Figure 1 is a perspective view of the body of the composite conveyer belt. Fig. 2 is a similar view of the improved wearing surface for the conveyer belt. Fig. 3 is a cross sectional elevation of the conveyer belt with the parts assembled. Fig. 4 is a top plan view of the conveyer belt. Fig. 5 is an enlarged broken detail end elevation of the united inclined wear layers for the conveyer belt.

In the drawings, the numeral 1 indicates the body proper of the improved conveyer belt, the same comprising rubber having embedded therein one or more layers of horizontally disposed layers of textile fabric 2. Usually four layers of horizontally disposed textile fabric 2 are incorporated in the body of the belt for securing the requisite longitudinal and cross sectional strength for the belt, although the number of horizontally disposed layers within the body portion of the belt may be increased and decreased as desired.

To the upper surface 3 of the body 1 there is secured, so as to constitute an integral portion of the belt, a wear surface 4, which is disposed longitudinally of the belt and held between the longitudinally disposed spaced side members 5—5', which members are composed of rubber. The wear surface 4 consists of a series of parallel layers 6 of textile fabric cut on the bias, each layer be ing separated from adjacent layers by the rubber layer 7, which when vulcanized unite the textile layers one to the other forming a built-up wear surface composed of alternate layers of rubber and textile fabric cut on the bias.

Instead of arranging the layers 6 and 7 at a perpendicular to the horizontal layers of the conveyer belt, as in the case of the invention of the aforesaid Letters Patent No. 814416, the same are set obliquely or at transverse inclination to the horizontal layers 2 of the body 1, each obliquely disposed layer 6 overlapping an adjacent layer of textile fabric. Inasmuch as the fibers of the layers 6 of the textile fabric are set diagonally, due to the fact that the material composing the same is cut on the bias, when the said layers so cut on the bias are positioned relatively to each other so that each layer stands at a transverse inclination to the horizontal layers 2 of the body 1 of the conveyer belt, there is provided free expansion for the layers 6 longitudinally and transversely, so that the wearing surface expands free in all directions relative to the body of the belt, the transverse disposition of the layers 6 of the conveyer belt being such that all wear which occurs from the friction of the material deposited thereon being substantially and in fact wholly upon the ends of the said layers, which wear is to a much less extent than would otherwise take place.

By arranging the longitudinally disposed parallel layers 6 at an inclination to the horizontal and the face of one layer overlapping the face of an adjacent layer, the said layers when the members of the conveyer belt are assembled and united by vulcanization are interlocked one with the other and the assembled layers 6 give in unison to longitudinal and transverse expansion, consequently, the contraction and expansion of the conveyer belt during the troughing periods thereof has not the effect of tearing or separating the said united layers 6, with the result that the material being conveyed does not work between the faces of the longitudinally disposed transversely inclined layers 6, and the life of the belt is materially prolonged.

The preferred method of manufacturing the improved conveyer belt is first to form the body 1 of dough rubber having the horizontal layers 2 of textile fabric embedded therein, and to the horizontal face thereof apply the partially formed wear surface consisting of the parallel layers 6 of textile fabric cut on the bias separated by the layers 7 of dough rubber, the layers 6 being arranged at an incline to the horizontal with the faces thereof overlapping and the same held between longitudinal spaced side members 5 and 5' formed of dough rubber. The members thus assembled are subjected to the usual method for the vulcanization of the dough rubber for the uniting of the assembled parts as an integral structure and when so united the composite body 1 is provided with an upper wear surface comprising a series of parallel longitudinally disposed fabric layers 6 cut on the bias and arranged at a transverse inclination to the horizontal surface of the body 1 of the conveyer belt. However, any suitable mode of construction may be employed, the only requirement being that when the conveyer belt is completed as an article of manufacture it shall be provided with a longitudinally disposed wear surface consisting of a series of overlapping interlocked layers of fabric cut on the bias arranged at an inclination transverse to the horizontal surface of the body portion.

Having thus described the invention what is claimed as new and desired to be protected by Letters Patent is:—

1. As an article of manufacture, a conveyer belt having as an integral part and on the upper face thereof a wearing member which constitutes the wearing surface of the belt, the same comprising a series of longitudinally disposed layers of textile fabric cut on the bias set at a transverse inclination relative to the horizontal surface of the upper face of the belt and united one to the other so that the face of adjacent members overlap, the said layers being united one to the other by rubber interposed between the faces thereof and vulcanized.

2. A wear pad for a conveyer belt, comprising a series of longitudinally disposed layers of textile fabric cut on the bias, set at a transverse inclination to the horizontal surface of the wear pad and united one to the other by adhesive elastic material interposed therebetween so that the faces of adjacent layers overlap, and spaced longitudinally disposed side binding members composed of adhesive elastic material and united to the outer fabric layers thereby.

3. The combination with a flexible conveyer belt of a wear pad therefor comprising a series of longitudinally disposed layers of textile fabric, set at a transverse inclination to the horizontal surface of the wear pad, and united one to the other so that the faces of adjacent layers overlap.

In testimony whereof I have signed my name to this specification in the presence of two subscribing witnesses.

WILLIAM F. BOWERS.

Witnesses:
HARRY A. TOTTEN,
D. B. RICHARDS.